United States Patent [19]
Black

[11] Patent Number: 5,609,418
[45] Date of Patent: Mar. 11, 1997

[54] CLAPEYRON THERMOMETER

[75] Inventor: Patrick B. Black, Hanover, N.H.

[73] Assignee: The United States of America as represented by the Secretary of the Army, Washington, D.C.

[21] Appl. No.: 354,070

[22] Filed: Dec. 6, 1994

[51] Int. Cl.$^6$ .......................... G01K 11/00; G01K 11/06
[52] U.S. Cl. .......................... 374/159; 374/143; 374/160
[58] Field of Search .......................... 374/159, 203, 374/143, 160

[56] References Cited

U.S. PATENT DOCUMENTS

| | | | |
|---|---|---|---|
| 1,272,554 | 7/1918 | Steenbjerg | 374/159 |
| 1,343,454 | 6/1920 | Jeannet | 374/159 |
| 1,615,505 | 1/1927 | Cornman et al. | 374/159 |
| 2,639,189 | 5/1953 | Bragg et al. | 374/159 |
| 2,651,942 | 9/1953 | Minter | 374/159 |
| 3,410,141 | 11/1968 | Zurstadt | 374/159 |
| 3,851,527 | 12/1974 | Hofman et al. | 374/159 |
| 3,992,944 | 11/1976 | Woodle | 374/159 |

FOREIGN PATENT DOCUMENTS 0110024   9/1981   Japan .......................... 374/159

*Primary Examiner*—Diego F. F. Gutierrez
*Attorney, Agent, or Firm*—Luther A. Marsh

[57] ABSTRACT

A high resolution thermometer operated by the pressure of a solid/liquid phase mixture is characterized by a vessel containing the mixture, a pressure sensor and a pressure indicator. A relatively small change in the temperature to be measured causes the proportion of solid and liquid in the vessel to change, thereby producing a dramatic change in pressure which can be measured with greater accuracy than the relatively small temperature change. Temperature is determined by converting the pressure to temperature using the appropriate thermodynamic relationship.

3 Claims, 1 Drawing Sheet

5,609,418

CLAPEYRON THERMOMETER

BACKGROUND OF THE INVENTION

The present invention relates to a pressure thermometer and, in particular, to a high resolution solid/liquid, pressure thermometer.

Traditionally, high resolution temperature measurements have been obtained by measuring the resistance change of a highly conductive metal, such as platinum, in a resistance temperature detector (RTD) or by measuring the resistance change in elements made from a ceramic-like semiconductor material in a thermistor. Costly and bulky bridge networks required to measure the small resistance changes, however, make routine use of platinum resistance thermometry prohibitive in many environments, and while thermistors do not require as sensitive a bridge network as an RTD, they do suffer from behavioral changes with time that require periodic calibration.

BRIEF DESCRIPTION OF THE PRIOR ART

Liquid/vapor filled pressure thermometers are well known in the patented prior art. For example, the U.S. patent to Jeannet U.S. Pat. No. 1,343,454 discloses an improvement to a thermometer in which temperature is indicated by a pressure gage that is hydraulically connected to a thermometric reservoir containing a volatile liquid in the presence of its saturated vapor.

The U.S. patent to Cornman et al U.S. Pat. No. 1,615,505 discloses a similar type of vapor actuated thermometer in which a confined body of liquid is exposed to the temperature to be measured and the pressure developed as a result of the vaporization of the liquid is used to actuate a pointer associated with a scale.

These thermometers, however, lack the sensitivity necessary to accurately measure small changes in temperature. The present invention was developed in order to overcome these and other drawbacks by providing a high resolution pressure responsive thermometer.

SUMMARY OF THE INVENTION

Accordingly, it is a primary object of the present invention to provide an improved thermometer capable of detecting temperature changes with a high degree of resolution using low cost technology. This object is accomplished by measuring the large pressure changes which result when a mixture of a liquid and its solid are subjected to a temperature change below the equilibrium melting temperature of the bulk material in a constant volume reservoir as predicted by the Clapeyron equation.

According to a more specific object of the invention, a vessel is provided which is filled with a substance such as water which is changeable between solid and liquid phases in accordance with the ambient temperature. The proportion of liquid within the vessel increases with increases in temperature, thereby increasing the pressure within the vessel. Conversely, the proportion of liquid within the vessel decreases with decreases in temperature, thereby decreasing the pressure within the vessel. A pressure sensor is connected with the vessel and an indicator is connected with the sensor to provide an indication of ambient temperature as a function of the pressure within the vessel.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
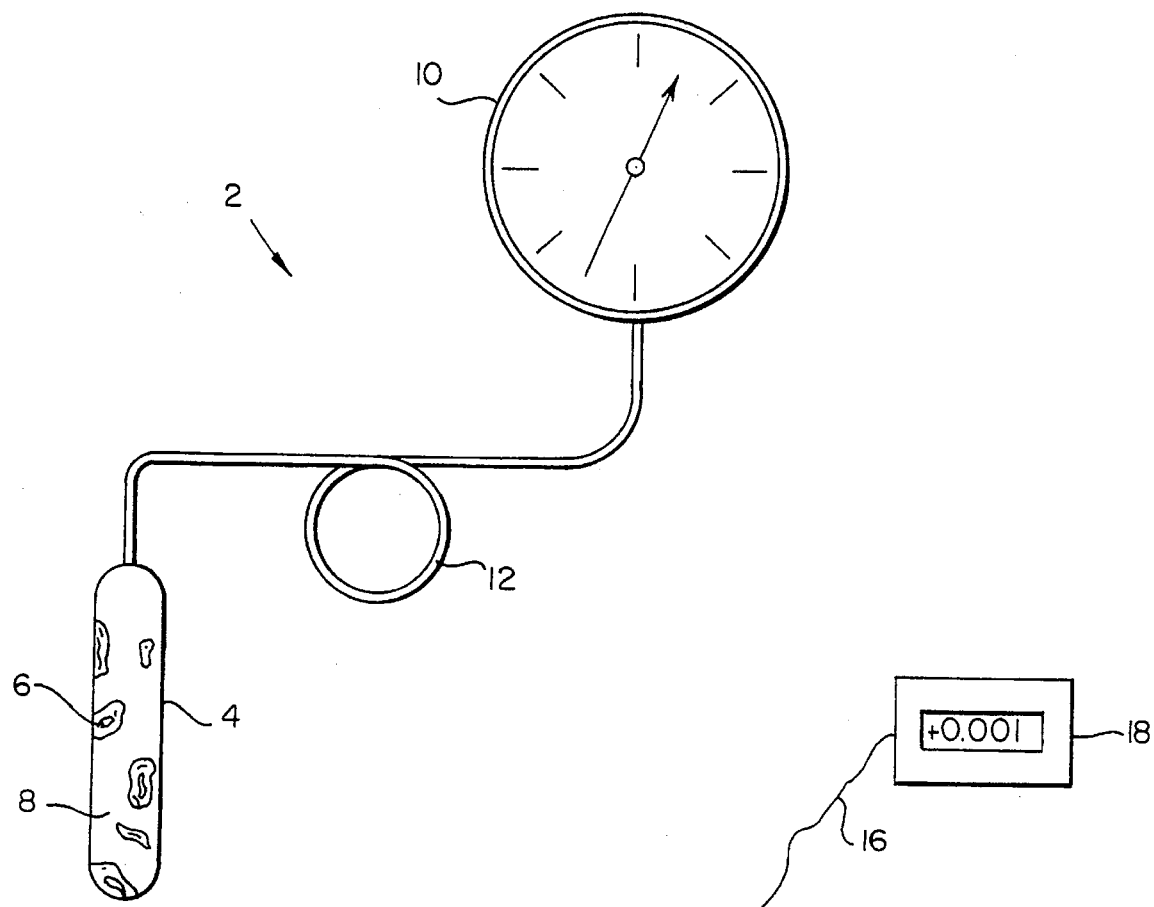
FIG. 1 is a schematic diagram of a thermometric system embodying the invention with a sectional view of the temperature vessel.

Referring first to FIG. 1, the pressure operated thermometric system 2 of the invention includes a constant volume vessel 4 filled with a substance coexisting as a mixture of a solid 6 and its liquid phase 8 is shown. When the vessel 4 is exposed to a temperature below the equilibrium melting point, the proportion of solid 6 to liquid 8 within the vessel 4 changes, thereby producing a pressure change of relatively greater magnitude which can be more easily and accurately measured than the temperature change. This pressure is transmitted to a mechanical dial pressure gage 10 through a liquid filled tube 12 extending from the vessel 4. In this embodiment, the thermal expansion of the liquid in the tube 12 must be accounted for in any pressure change.

In a preferred embodiment, the vessel substance is water and the mixture comprises water and ice. The temperature vessel 4 is first brought to a temperature at, or slightly below, the freezing point of water. This is accomplished by simply submersing the temperature vessel 4 in a bath of ice and water (not shown). The water in the temperature vessel 4 is then seeded with an ice crystal. This is accomplished by subjecting the temperature vessel 4 to a cold source of less than 0° C. or by mechanical shock nucleation.

Temperature indication is obtained by measuring the pressure with the pressure gage 10 and converting the pressure to temperature through the equilibrium thermodynamic relationship between pressure and temperature called the Clapeyron equation. For water, this relationship is −0.0741 C/MPa. This temperature indication is displayed to a user using one of the very well known methods and apparatus available in the art. For example, once the pressure is measured electronically, it is then converted by suitable well known firmware to the corresponding temperature that is displayed to the user. Or, the pressure is measured with a mechanical pressure gauge with the scale on the dial presented in units of temperature. Or, the pressure is measured and the conversion is done externally with a computer or simple mental calculation.

For water, at temperatures slightly below the normal freezing temperature of 273.15K, ice pressure changes on the order of 10 MPa/K. Thus, small changes in temperature will result in large changes in pressure. It is relatively inexpensive to measure pressures in the 0 to 1 MPa range and to do so with a precision of less than 1 kPa which corresponds to a temperature of 0.01 K.

The useful range of measurement can be shifted to lower temperatures by adding a known concentration of a solute to the filling substance. This lowers the freezing point which, for dilute solutions, is readily calculated by the van't Hoff equation. Major shifts from the 273.15K temperature range for water are possible by using different filling substances. These other substances, however, will have unique relationships for converting pressure to temperature.

In the ideal mode of operation, the substance in the temperature vessel 2 will be pure. If an unknown amount of impurities exist in the substance, the device will require calibration.

Figure 2:
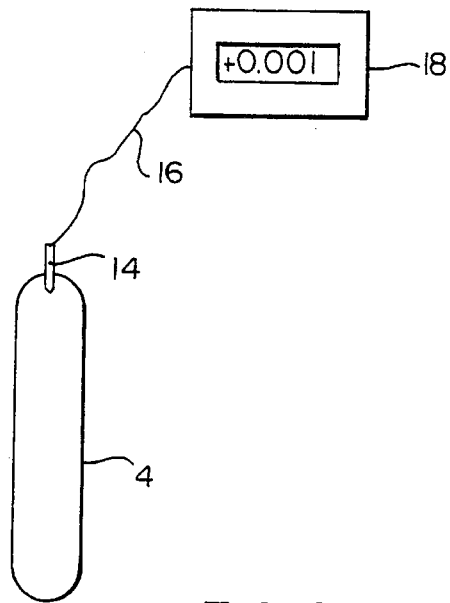
FIG. 2 is an alternate embodiment of the invention.

In FIG. 2 a functionally equivalent thermometric system is shown in which the pressure within the vessel is measured by an electronic pressure transducer 14, a wire 16, and a digital readout device 18.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. A pressure responsive thermometer for determining ambient temperatures at or below the equilibrium melting point of a substance comprising
    (a) a vessel containing the substance, the substance being changeable between solid and liquid phases in accordance with the ambient temperature, the proportion of the liquid phase of the substance within said vessel increasing with increases in ambient temperature while the proportion of solid phase of the substance within said vessel decreases thereby increasing the pressure within said vessel, and the proportion of the liquid phase of the substance within said vessel decreasing with decreases in ambient temperature while the proportion of solid phase of the substance within said vessel increases, thereby decreasing the pressure within said vessel;
    (b) means connected to said vessel for sensing said pressure within said vessel;
    (c) means connected to said sensing means for indicating said pressure; and means cooperating with said pressure indicating means for converting said pressure within said vessel to an indication of the ambient temperature.

2. A thermometer as defined in claim 1, wherein said substance comprises water.

3. A thermometer as defined in claim 1, wherein said substance includes a given concentration of a solute, thereby lowering the equilibrium melting temperature of said substance.

* * * * *